United States Patent [19]

Elliott

[11] 4,137,208

[45] Jan. 30, 1979

[54] COATING COMPOSITION

[75] Inventor: William T. Elliott, Concord West, Australia

[73] Assignee: Berger, Jenson & Nicholson Limited, London, England

[21] Appl. No.: 793,857

[22] Filed: May 4, 1977

[30] Foreign Application Priority Data

May 6, 1976 [AU] Australia ............................. PC5834

[51] Int. Cl.$^2$ .............................................. C08L 31.02
[52] U.S. Cl. ........................ 260/29.6 RB; 260/29.6 R; 260/29.6 MH; 260/42.55
[58] Field of Search ..... 260/2.5 M, 29.6 R, 29.6 MH, 260/29.6 RB, 42.55

[56] References Cited

U.S. PATENT DOCUMENTS

| 3,669,729 | 6/1972 | Seiner | 260/29.6 R |
| 3,817,880 | 6/1974 | Kreider | 260/29.6 R |
| 3,839,253 | 10/1974 | Kershaw et al. | 260/29.6 RB |
| 3,941,727 | 3/1976 | Timmerman et al. | 260/29.6 R |
| 3,949,138 | 4/1976 | Heiser | 260/29.6 R |

FOREIGN PATENT DOCUMENTS 1312083 4/1973 United Kingdom.
1328878 9/1973 United Kingdom.

*Primary Examiner*—Lewis T. Jacobs
*Attorney, Agent, or Firm*—Wenderoth, Lind & Ponack

[57] ABSTRACT

Pigmented coating compositions having improved opacity and film strength comprise an aqueous latex of film-forming resin binder, a non-solvent for the resin binder of sufficiently low volatility to produce, upon first removing water from a film of the coating composition and secondly removing said non-solvent, a continuous non-porous microcellular film having minute discrete substantially closed voids, non-film-forming granules of a polymer which is not dissolved by the non-solvent, and pigment and/or extender, which may be present in the latex or the non-solvent or the polymer granules. The polymer granules may be spheroidal beads or aggregates. The non-solvent and the polymer granules alleged to act synergistically to improve the opacity of the paint.

10 Claims, No Drawings

COATING COMPOSITION

This invention relates to coating compositions, in particular non-glossy water-reducible paints containing synthetic latex binders.

British patent specification No. 1,328,878 provides latex compositions which form continuous opaque films comprising an aqueous continuous phase and particles of a coalescable polymer dispersed therein, said composition containing a non-solvent for said coalescable polymer in an amount and of sufficiently low volatility as to produce, on first removing water from said continuous phase and secondly removing said non-solvent, a continuous, non-poruous, micro-cellular and opaque film having minute discrete and substantially closed voids. The technical problem with which the Patent is concerned centres round the stp of causing the coalescable polymer to gel into a continuous film containing the non-solvent in the form of minute dispersed droplets, and then removing the non-solvent without allowing the coalescable polymer to collapse or fill the resulting minute voids. Lack of control may result, for example, in loss of the non-solvent before gellation of the polymer, or greater difficulty in removing the non-solvent from the gelled polymer film, or excessive flow of the gelled polymer, and in such cases the minute voids which contribute to the opacity of the film are not formed. The Patent proposes five control techniques for ensuring the formation of the minute voids:-

(a) The temperature of the applied film of composition is controlled during removal of water so that the system during flow or coalescence is held at the required temperature above its glass transition temperature of minimum filmforming temperature.

(b) When the coalescable polymer is a non-film-former or a poor film-former good film-forming resins, coalescers or plastisols maybe incorporated in the system.

(c) When the coalescable polymer is a good film-former, flow-inhibiting agents may be added to the system.

(d) When the coalescable polymer is a good film-former, one or more non-film-formers and/or marginal film-formers may be incorporated in the system.

(e) The non-solvent may be chosen to have a sufficiently low volatility such that the film is essentially tack-free prior to evaporation of the non-solvent. Although the Patent does provide a valuable technique for producing opacity, paints produced in accordance with its teachings are found to have disadvatanges. For example, the micro-voids in the film render it prone to the collection of contaminants and when attempts are made to clean the surfaces, the film is found to be weak and with poor resistance to abrasion. Furthermore, the opacity of such paints is variable as it depends very largely on the temperature and humidity conditions prevailing while the applied film is drying. These factors reduce the usefulness of what would otherwise be a desirable technique for providing opacity.

The present invention arises from the discovery that the properties of such coating compositions may be improved by incorporating therein non-film-forming polymer granules. The invention provides in one aspect a coating composition comprising:

(a) an aqueous latex of film-forming resin binder (b) finely dispersed therein, from 0.05 to 3 parts, per part by weight of the film-forming resin binder, of a nonsolvent for the film-forming binder of sufficiently low volatility to produce, on first removing water from the latex and secondly removing said non-solvent, a continuous non-porous microcellular film having minute discrete closed particles, and (c) non-film-forming granules of size up to 150 microns of a polymer which is not dissolved by water or by the nonsolvent, present in an amount of from 5 to 75% by volume of the non-volatile content of the composition.

The use of solid polymer granules, both pigmented and unpigmented, in combination with pigments and extenders, as a means of providing non-glossy coatings is known, and is described for example in British patent specification No. 1,312,083 and in Berger Paints (Australia) Pty. Limited, pending Australian Patent Applications 7853/76 and 9505/77 as well as U.S. application Ser. No. 844,486, filed Oct. 6, 1977. This technique results in non-glossy films of desirable uniformity and film integrity in water-thinned latex paints.

The present invention is based on the discovery that if polymer granules are added to films generally of the type disclosed in British patent specification No. 1,328,878, many of the deficiencies of such films are overcome and opacity of the film is greater than would be expected, that is to say there appears to be a synergystic effect in that the opacity is greater than the sum of the opacities produced by the individual techniques. These effects are obtained using polymer granules both containing pigment (as disclosed in British specification No. 1,312,083) and when pigment free.

It is disclosed in British patent specification No. 1,328,878 that when the ratio of pigment and extender to binder in a particular composition exceeds a critical value no film is formed. In the practice of the present invention it has been found that the addition of polymer granules substantially increases the critical ratio of pigment and granules to binder above which no satisfactory film is formed.

In formulating paints which rely on polymer granules to confer "flatness" it has previously been thought necessary either to provide pigment outside the polymer granules or unusual levels of thickeners, to provide paint with viscosity high enough to enable the application of films of the necessary thickness and to maintain the components in suspension over extended periods. The incorporation of the dispersion of non-solvent in the system provides a desirable increase in the paint viscosity without the necessity to incorporate undesirable levels of thickener or extender pigment.

It has also surprisingly been found that the incorporation of polymer granules provides a further technique (in addition to the five noted above as (a) to (e)) for controlling the entrapment of the non-solvent. As a result, it is possible in the present invention to use non-solvents which are more volatile than those previously thought necessary, and this is advantageous since it permits more rapid and ready removal of the non-solvent from the paint film.

The non-solvent preferably has a boiling point of at least 150° C., preferably from 200° C. to 300° C. More volatile non-solvents are liable to evaporate from the paint film before the polymer has gelled; less volatile non-solvents are likely to be difficult to remove from the paint film at all. Suitable non-solvents are those disclosed in British patent specification No. 1,328,878, and include hydrocarbons, particularly aliphatic hydrocarbons such as mineral oils.

The proportion of non-solvent to film-forming resin binder in the coating composition is preferably from 0.1:1 to 1:1 by weight. The presence of very small amounts of nonsolvent does not materially contribute to the opacity of the final paint film. By providing micro-voids, the non-solvent both improves the opacity and reduces the strength of the paint film, and at high levels of non-solvent the reduction in strength effect is paramount.

The polymer granules are of a size up to 150 microns, though it will be understood that a few granules above this limit would not necessarily be disadvantageous. For a silky matt finish, it is preferred that the polymer granules shall have an average particle size in the range 5 to 60 microns, e.g. that 80% of the particles should have sizes within this range. If the paint film has an unacceptably seedy appearance, this can quite readily be remedied by reducing the maximum size of the polymer granules. Granules below 1 micron do not materially contribute to the advantageous properties of coating compositions of this invention.

We have done work with polymer granules of two types; spheroidal polymer beads such as are describved in British patent specification No. 1,312,083; and aggregates of primary polymer particles which form the subject of Australian Patent Applications 7853/76 and 9505/77 noted above, which will be further described below. We have, however, no reason to suppose that these are the only suitable kinds of polymer granules, and the invention therefore envisages the use of polymer granules of various shapes and constitutions.

Australian Patent Applications 7853/76 and 9505/77 describe polymer aggregates in the form of discrete particles of substantially uniform size below 150 microns maximum dimension which are themselves aggregates of primary particles of a polymer derived from at least one ethylenically unsaturated monomer together with from 0 to about 400%, by weight on the weight of the monomer, of an organic thickener compatible with the monomer. The aggregate particles are of irregular shape and may be approximately spherical or chunky or elongated or provided with spines, depending on the conditions of preparation. Depending also on the conditions of preparation, the primary particles constituting the aggregates may be readily visible in electron microscope pictures of the aggregates or may be substantially fused together. Typically, the primary particles will be generally spherical with an average diameter of 0.2 to 2.0 microns. The aggregates may be made by providing an aqueous dispersion of the unsaturated monomer together with the organic thickener, introducing a polymerisation catalyst into the aqueous phase of the dispersion so as to initiate polymerisation of the monomer, and maintaining the dispersion under conditions of high shear and continuing polymerisation to substantial completion. It is believed that initial polymerisation takes place in the aqueous phase, and the solubility of the monomer in water is therefore of importance in determining the rate of polymerisation. Particle size of the aggregates can be closely controlled by controlling the conditions of shear during polymerisation, and by including a colloid stabilizer such as polyvinyl alcohol in the system.

The polymer granules (e.g. aggregates or beads) may suitably be derived from $\alpha,\beta$-ethylenically unsaturated monomers including styrene and other vinyl and vinylidine aromatic monomers; vinyl acetate; acrylates and methacrylates such as methyl methacrylate, ethylacrylate, ethylhexylacrylate and lauryl acrylate; acrylamides and methacrylamides; acrylic and methacrylic acid; and mixtures thereof. It may be advantageous to include a minor proportion of a di-unsaturated monomer, for which purpose, for example, ethyleneglycol dimethylacrylate and divinylbenzene are suitable. Polymerisable mixtures of monomers with unsaturated polyester resins may be used with advantage.

The granules are present in the coating composition in an amount (known as the bead volume content or bvc) of from 5 to 75%, preferably 45 to 70%, by volume on the non-volatile content of the composition. In this connection, it should be mentioned that the non-solvent is counted as a volatile ingredient and is therefore not included in calculating the non-volatile content of the composition. While the polymer granules themselves contribute to the opacity of the film, this contribution is proportionately smaller at high bvc's. Also, high bvc's imply low proportions of film-forming resin binder and hence weak films. These factors place an upper limit on the proportion of polymer granules that may advantageously be used.

The coating compositions of this invention preferably contain pigment and/or extender in an amount from 5% to 50%, particularly from 12% to 25%, by volume of the non-volatile content of the composition. Pigments and/or extenders which are conventional in the paint industry may be used here. However, because much of the opacity of films formed from coating compositions of this invention derives from the micro-voids and the polymer granules, the contribution to the opacity provided by the pigment or extender need not be so great. For this reason, it is possible to use a high proportion of extender, which is cheap but has low covering power, and a lower proportion of pigment, which is expensive but has good covering power, in coating compositions of this invention. A preferred pigment is titanium dioxide; preferred extenders include whitings, gypsum, china clays and silica. As is taught in British patent specification No. 1,328,878, the increased ise of extenders enables more effective use to be made of fluorescent materials or optical brighteners in the coating composition.

The pigment and/or extender may be incorporated in the conventional way in the aqueous latex portion of the composition. Alternatively, part or all of the pigment and/or extender may be present in the non-solvent and-/or the polymer granules. For example, the pigment and/or extender may be dispersed in the non-solvent before the latter is added to the latex paint. Alternatively, both British patent specification No. 1,312,083 and Australian Patent Applications 7853/76 and 9505/77 describe how pigment may be incorporated in polymer granules. Polymer granules may contain up to 90%, preferably from 10 to 70%, by weight of pigment and/or extender.

The resin binder must be capable of forming a film under the conditions of use of the coating composition, which will normally, but not necessary, be at ambient temperature. Where the minimum film-forming temperature of the resin binder is higher than the proposed temperature of use, it may be possible to add coalescing aids such as plasticizers to achieve the desired effect. The nature of the resin binder is not critical to the present invention and suitable resin binders are well known in the art and are described in British patent specification No. 1,328,878. Typical examples include vinyl esters and acrylic and methacrylic esters and copolymers thereof. The concentration of the resin binder in the latex should be chosen to provide, in conjunction with the other ingredients, a coating composition having the desired viscosity. The coating compositions may also include thickeners, emulsifiers, surface active agents, plasticizers, optical brighteners, fluorescent materials, anti-foam agents, anti-oxidants, fungicides and other ingredients as is conventional in the latex paint field.

The invention also includes a method of producing a film which comprises applying the coating composition described above to a substrate, removing water from the applied composition while at the same time controlling the entrapment of the non-solvents so as to form a continuous film of the resin binder containing minute droplets of the non-solvent and also the polymer granules, and thereafter removing the non-solvent to thereby provide a continuous opaque nonporous microcellular film having minute discrete closed voids.

Properties of paint films formed from the coating composition of this invention can be assessed under five headings:

(a) Opacity
(b) Burnish resistance
(c) Scrub resistance
(d) Stain removal
(e) Gloss-up after stain removal.

These will now be discussed in turn.

(a) Opacity. This is conventionally measured as a contrast ratio as described in ASTM D2805/70. Paints have a contrast ratio above about 80% are of greatest commercial interest. Coating compositions not containing any pigment have a much lower contrast ratio; but the use of such compositions enables the contributions to opacity made by the other ingredients to be more readily observed. In consequence, in some of the experimental work reported below pigment has been omitted from the coating composition; it could readily be incorporated in such compositions, for example, in the polymer granules, without altering their properties. Factors affecting contrast ratio include the following:

(i) Provided that the resin binder forms a coherent film, it is in general true that the higher the minimum film-forming temperature of the binder, the better the contrast ratio of the composition.

(ii) The contrast ratio may be increased by increasing the proportion of non-solvent, albeit at the expense of some other properties of the film.

(iii) Contrast ratio may be increased by increasing the bvc, albeit at the expense of other properties of the film.

(iv) As the granule size increases the effectiveness of the granules as opacifiers in their own right decreases. Their effectiveness as flow control agents also decreases at low bvc (judged by contrat ratio difference) but at high bvc it increases with increase in particle size. The result is that mixtures of aggregate sizes show less variation in contrast ratio with change in bvc than mono-disperse systems.

(b) Burnish resistance. This is measured by giving 25 rubs to the surface of the paint with a soft dry cloth across the direction of the brush marks. The degree of gloss development is assessed at a low angle of vision and rated from 0 (very high gloss development) to 10 (no gloss development). Factors of significance in improving in burnish resistance include:

(i) The use of polymer granules having a particle size in the range 30 to 60 microns. From this viewpoint, it may be valuable to have from 5 to 8%, by volume on the volume of the dry film, of resin granules of from 40 to 60 microns size.

(ii) It appears that burnish resistance falls somewhat as bvc increases. However, an increase in the non-solvent concentration does not appear to reduce burnish resistance.

(c) Scrub resistance. The measurement of this property involves applying the composition at 112 microns to a proprietary scrub chart which has previously been cleaned with alcohol to remove dust particles etc., a standard being applied alongside the test batch. The film is allowed to dry in a vertical position for 16 hours, then clamped to the base plate of the scrub machine; 10 grams of scrub medium (see below) is weighed onto the brush, the brush attached to the drive cables, and the machine started. 5 mls of water are added to the chart in the path of the brush. Every 200 scrubs the chart is turned through 180 degrees and every 400 scrubs fresh scrub medium and water are used. The scrub medium comprises water (497 parts by weight), surface active agent (5 parts), trisodium phosphate (20 parts), silica (450 parts), cellulose thickener (10 parts), glacial acetic acid (2 parts). The scrub resistance is the number of scrubs required to form a continuous line of complete wear in the paint film. Factors of significance in providing scrub resistance include:

(i) The scrub resistance of of coating compositions containing non-solvent may be quite dramatically improved by the addition thereto of polymer granules.

(d) Stain removal. Twenty four hours after application, the following stains are applied to the film: soft pencil; hard pencil; tomato sauce; lipstick; margerine/garden soil mixture; wax crayon; old sump oil; metal scruff. The stains are allowed to remain in position for 1 hour, then cleaned off using 1% surfactant aqueous solution and a soft sponge. Twenty-five wipes are given to the stains, one wipe being a complete forward and return movement of the sponge. The film is allowed to dry naturally after excess water is gently dried off, by dabbing with a soft cloth, and the stain removal rated visually on a 0-10 scale for each individual stain; 0 is no removal of stain and 10 is complete removal. Factors affecting stain removal include:

(i) Coating compositions containing non-solvent but no polymer granules are poor for stain removal. The incorporation of granules, particularly of acrylate and methacrylate polymers, dramatically improves stain removal properties.

(ii) Spheroidal beads perform better, as regards stain removal, than do polymer aggregates.

(e) Gloss-up after stain removal. This is measured in the same way as burnishing described above under (b), except that a wet cloth is used in place of a dry one.

At high bvc, compositions containing large polymer granules (30–60 microns) contain large spaces between them filled with binder resin, in which minute voids formed by evaporation of the non-solvent can contribute significant opacity. In compositions containing small polymer granules (5–25 microns), the non-solvent does not, at high bvc, contribute so much opacity. For this reason, and because large polymer granules provides improved burnish reistance and stain removal properties, it is preferred that the coating composition contains at least 3%, by volume on the non-volatiles present, of polymer granules having an average size of from 35 to 50 microns. As emerges from the Examples below, it is advantageous to use polymer granules having a range of sizes, e.g. 5–60 microns, rather than a single size.

COMPARATIVE EXAMPLE

There was made up a typical flat latex paint according to British Patent Specification No. 1,328,878, containing non-solvent, at 0.49 parts per parts by weight of binder resin, but no polymer granules.

A film prepared from the paint had the following properties:

| Test | Rating |
| --- | --- |
| Contrast ratio | 93% |
| Stain removal | 5 |
| Burnishing | 6 |
| Scrub resistance | 390 |

EXAMPLE 1

In experiments leading to the present invention three film-forming compositions were produced. Namely, composition 1 being a micro-void composition incorporating a hydrocarbon non-solvent, composition 2 being a composition containing polymer granules but not containing the non-solvent and composition 3 containing both the non-solvent and the polymer granules. Thus compositions 1 and 2 are in accordance with the above discussed prior art and composition 3 is in accordance with the invention.

Composition 1 contained 100 parts by weight of a latex known as Primal AC 388 (a product as Rohm and Haas), which contains a copolymer of 65% butyl acrylate and 35% acrylonitrile, 20 parts by weight of a hydrocarbon non-solvent known as ISOPAR M, being an aliphatic hydrocarbon with a boiling point of 210°–250° C. 20 parts by weight of water and 1.5 parts by weight of a non-ionic wetting agent known as TERIC XII, being a condensate of nonylphenol with 11 moles of ethylene oxide.

Composition 2 was the same as composition 1 above except in that it did not include the ISOPAR M and it did include 11.4 parts by weight of polymer granules, being granules of a polymer comprising 60% styrene 40% polyester and with a particle size in the range of 2 to 40 microns.

Composition 3 was the same as composition 1 except in that it included 11.4 parts by weight of the beads of composition 2.

When considering the opacity of the test compositions once reduced to film form and using a measuring technique substantially the same as that disclosed in Specification 1328878 it was found that the film opacity of composition 3 was substantially and unexpectedly higher by about 30% than the sum of the film opacities of compositions 1 and 2 (allowing of course for the film thickness in each case. That is to say a film of composition 3 equal in thickness to the combined thickness of two films respectively of compositions 1 and 2 displayed an opacity 30% higher than that of those two films taken together.

EXAMPLES 2 to 6

These Examples show the effect of variation of polymer aggregate particle size in a latex paint composition both containing and not containing non-solvent.

TABLE 1

| | Example No. | | | | |
| --- | --- | --- | --- | --- | --- |
| Ingredient | 2 | 3 | 4 | 5 | 6 |
| Polymer Aggregate 30–50 microns (70% nv) | 142.8 | | 71.4 | 142.8 | |
| Polymer Aggregate 5–10 microns (95.4% nv) | | 104.8 | 52.4 | | 104.8 |
| 1.6% Cellulose thickener | 311.0 | 311.0 | 311.0 | 311.0 | 311.0 |
| Water | 166.2 | 204.2 | 185.0 | 166.2 | 204.2 |
| 25% Anionic Disperant Solution | 10.0 | 10.0 | 10.0 | 10.0 | 10.0 |
| Defoamer | 3.0 | 3.0 | 3.0 | 3.0 | 3.0 |
| Tributyl tin fungicide | 0.3 | 0.3 | 0.3 | 0.3 | 0.3 |
| Tetrasodium pyrophosphate | 1.0 | 1.0 | 1.0 | 1.0 | 1.0 |
| Ammonia | 1.0 | 1.0 | 1.0 | 1.0 | 1.0 |
| Surfactant | 2.0 | 2.0 | 2.0 | 2.0 | 2.0 |
| Titanium dioxide | 323.0 | 323.0 | 323.0 | 323.0 | 323.0 |
| Aliphatic hydrocarbon (non-solvent) | 60 | 60 | 60 | | |
| Acrylic resin binder | 221.0 | 221.0 | 221.0 | 221.0 | 221.0 |
| Hydroxy ester solvent | 10.0 | 10.0 | 10.0 | 10.0 | 10.0 |
| Phenyl mercury preservative (10% Hg) | 1.0 | 1.0 | 1.0 | 1.0 | 1.0 |

| | Example No. | | | | |
| --- | --- | --- | --- | --- | --- |
| Property | 2 | 3 | 4 | 5 | 6 |
| Contrast Ratio % | 95.8 | 93.9 | 95.5 | 92.3 | 90.1 |
| Stain removal | 6 | 6 | 6 | 6 | 6 |
| Burnishing | 10 | 7 | 9½ | 9½ | 7 |
| Scrub resistance | 800 | 385 | 660 | >1200 | 850 |

EXAMPLE 7

In this Example, non-pigmented compositions are used to illustrate the effect on contrast ratio of altering the proportion of non-solvent. In all cases the polymer granules are aggregates in the size range of 30 to 50 microns. The mill base contains 41.6% polymer aggregates by weight. The colloid/surfactant levels are maintained constant.

a) 50% BVC
| Mill base: | 50.7% | (Granules = 21%) |
| Resin binder | 35.4% | (Latex Solids = 19.48%) |
| Hydroxy ester solvent | 1.0% | |
| Non-solvent + thickener | 12.9% | (i.e. as non-solvent is added, an equivalent weight of thickener solution is omitted.) |

| Amount of | Ratio of Non-solvent | Contrast |

-continued

| Non-solvent | to Latex Solids | Ratio |
|---|---|---|
| 9.72% | 0.5 : 1 | 20.53 |
| 1.95% | 0.1 : 1 | 12.19 |
| 0 | — | 7.4 | b) 67% BVC

| Mill base: | 50.7% | (Granules = 21%) |
| Resin binder | 17.5% | (Latex Solids = 9.6%) |
| Hydroxy ester solvent | 1.0% | |
| Non-solvent + thickener | 30.8% | |

| Amount of Non-solvent | Ratio of Non-solvent to Latex Solids | Contrast Ratio |
|---|---|---|
| 4.86% | 0.5 : 1 | 30.51 |
| 0.96% | 0.1 : 1 | 21.18 |
| 0.0% | — | 17.18 |

The Contrast Ratio of each formulation in Example 7 above and Example 8 below when polymer granules were omitted was about 0%. It is believed that this was partly because the non-solvent used was so volatile that, in the absence of polymer granules, it evaporated off before the resin binder had gelled sufficiently to be self-supporting; and partly because the latex binder used was a good film former. The non-solvent used was an aliphatic hydrocarbon having a boiling range of 210–250° C. sold under the Trade Name Isopar M. The binder resin used was that sold by Australian Chemical Holdings Pty. Ltd., under the Trade Mark Acropol CA 356, and is a vinyl acetate/butyl acrylate copolymer with a minimum film-forming temperature of 10° C., supplied at 55% solids. The polymer granules in Examples 7 and 8 are thus demonstrating valuable flow-inhibiting properties.

EXAMPLE 8

This Example uses non-pigmented coating compositions to demonstrate the effect of varying the polymer granule size and bead volume content on the opacity of the film, both in the presence and absence of non-solvent. The results of 24 runs are set out in Table 2 below. A typical paint formulation formulation, specifically that used for run No. 1, is as follows:

| Mill Base | |
|---|---|
| Unpigmented polymer aggregates, 30–50 microns (70% NV) | 1114.0 |
| Cellulose thickener (1.6%) | 140.0 |
| Water | 182.0 |
| 25% Anionic dispersant solution | 40.0 |
| Defoamer | 12.0 |
| Tributyl tin fungicide | 1.2 |
| Ammonia | 4.0 |
| Tetrasodium pyrophosphate | 4.0 |
| Surfactant | 8.0 |
| Water | 420.0 |
| Total (40.5% aggregate) | 1925.0 |
| Mill base | 240.7 |
| Non-solvent (aliphatic hydrocarbon) | 30.0 |
| Acrylic binder resin | 110.5 |
| Cellulose thickener (1.6%) | 125.5 |
| Hydroxy ester solvent | 5.0 |
| Phenyl mercury preservative (10% Hg) | 0.5 |
| | 512.3 |

In all of the formulations, the mill base constituted 47% by weight of the paint, and contained 40% by weight of polymer granules, so that the granules constituted 19% by weight of the paint. Variation of the bvc level was effected by varying the proportion of acrylic binder added to the mill base. The non-solvent was maintained at 50% by weight on the weight of the latex binder. Variation in the proportions of acrylic binder and non-solvent were compensated by addition of cellulose thickener as necessary. The colloid and surfactant levels were maintained constant. In Table 2, A Y indicates that non-solvent was present in that particular formation, and a N indicates that it was not. Four different kinds of polymer granules were used, all of them unpigmented, as follows:

1. Is a polymer aggregate of particle size 30–50 microns;
2. Is a polymer aggregate of 15–25 microns;
3. Is a polymer aggregate of 5–10 microns;
4. Is spheroidal beads of 5–25 microns.

Where the Table indicates mixtures of different kinds of granules, equal weights of each kind have been used. The bead volume contents in the Table are expressed on the non-volatile materials present in the coating composition, counting the non-solvent as a volatile ingredient.

Table 2

| Run | 1 | 2 | 3 | 4 | 5 | 6 | 7 | 8 |
|---|---|---|---|---|---|---|---|---|
| Granules | 1 | 1 | 1 | 1 | 2 | 2 | 2 | 2 |
| BVC | 50 | 67 | 50 | 67 | 50 | 67 | 50 | 67 |
| Non-solvent | Y | Y | N | N | Y | Y | N | N |
| Contrast ratio % | 15.8 | 20.3 | 4.7 | 7.3 | 32.4 | 45.8 | 15.1 | 19.7 |
| Stain removal | 9 | 6 | | | 7 | 6 | | |
| Gloss up | 10 | 10 | | | 9½ | 9½ | | |
| Burnish resistance | 10 | 10 | | | 9 | 8 | | |
| Scrub | 1130 | 800 | | | 750 | 280 | | |
| Run | 9 | 10 | 11 | 12 | 13 | 14 | 15 | 16 |
| Granuless | 3 | 3 | 3 | 3 | 4 | 4 | 4 | 4 |
| BVC | 50 | 67 | 50 | 67 | 50 | 67 | 50 | 67 |
| Non-solvent | Y | Y | N | N | Y | Y | N | N |
| Contrast ratio % | 39.1 | 48.5 | 29.6 | 48.0 | 15.6 | 22.6 | 5.0 | 9.4 |
| Stain removal | 7½ | 6 | | | 10 | 9½ | | |
| Gloss up | 9½ | 9½ | | | 10 | 10 | | |
| Burnish resistance | 8½ | 7½ | | | 10 | 10 | | |
| Scrub | 380 | 100 | | | 540 | 120 | | |
| Run | 17 | 18 | 19 | 20 | 21 | 22 | 23 | 24 |
| Granules | 1+2 | 1+2 | 2+3 | 2+3 | 1+3 | 1+3 | 1+ 2+3 | 1+ 2+3 |
| BVC | 50 | 67 | 50 | 67 | 50 | 67 | 50 | 67 |
| Non-solvent | Y | Y | Y | Y | Y | Y | Y | Y |
| Contrast ratio | 18.8 | 26.8 | 34.3 | 37.9 | 24.6 | 36.1 | 30.0 | 38.1 |
| Stain removal | 8 | 6.5 | 7 | 7 | 7.5 | 6.5 | 7.5 | 7 |
| Gloss up | 9.5 | 9.5 | 9.5 | 9.5 | 9.5 | 9.5 | 9.5 | 9.5 |
| Burnish resistance | 10 | 9 | 8 | 8 | 9 | 8 | 9 | 9 |
| Scrub | 860 | 142 | 291 | 102 | 684 | 110 | 852 | 259 |

EXAMPLE 9

This Example illustrates a coating composition in which the pigment is completely contained in the polymer granules

| Mill Base | Parts by Weight |
|---|---|
| Polymer aggregates 80% Rutile Titanium Dioxide (5–10 microns) | 410.0 |
| Polymer Aggregates Pigment free (35–50 microns) | 15.0 |
| 1.75% Cellulose thickener | 35.0 |
| Water | 229.0 |
| Anionic dispersant, 25% Soln. | 10.0 |
| Antifoam solution | 3.0 |
| Tributyl tin fungicide | 0.3 |
| Tetra sodium pyrophosphate | 1.0 |
| Ammonia | 1.0 |
| Surfactant | 2.0 |
| Aliphatic non-solvent | 60.0 |
| Water (mill wash) | 60.0 |
| Let down with | |

-continued

| Mill Base | Parts by Weight |
|---|---|
| Acrylic resin binder | 221.0 |
| 1.75% Cellulose thickener soln. | 176.0 |
| Hydroxy ester solvent | 10.0 |
| Phenyl mercury preservative (10% Hg) | 1.0 |
| Water | 35.0 |
| The paint has these properties:- | |
| Bvc | 62% |
| Unpigmented aggregates | 7.9% | by volume of total aggregates and 4.9% by volume of non-volatiles.

Application by brush or roller produces films which are matt, smooth and velvety with good wear and scratch resistance, and having the following properties:

| Contrast Ratio | 96.4% |
|---|---|
| Scrub | 460 |
| Stain removal | 8 |
| Gloss up | 9 |
| Burnish resistance | 9.5 |

What we claim is:

1. A coating composition comprising:
   (a) an aqueous latex of film-forming resin binder
   (b) finely dispersed therein, from 0.05 to 3 parts, per part by weight of the film-forming resin binder, of a non-solvent for the film-forming binder of sufficiently low volatility to produce, on first removing water from the latex and secondly removing said non-solvent, a continuous non-porous microcellular film having minute discrete closed voids, and
   (c) non-film-forming granules of a weight average particle size in the range of 5 to 60 microns of a polymer which is not dissolved by water or by the non-solvent, present in an amount of from 5 to 75% by volume of the non-volatile content of the composition.

2. A composition as claimed in claim 1, wherein the non-solvent is an aliphatic hydrocarbon having a boiling point of at least 150° C.

3. A composition as claimed in claim 1, wherein the volume ratio of non-solvent to film-forming resin binder is from 0.1:1 to 1:1.

4. A composition as claimed in claim 1, wherein the polymer granules have an average size of from 5 to 50 microns.

5. A composition as claimed in claim 4, wherein there are present at least 3%, by volume on the non-volatiles, of polymer granules having an average size of from 35 to 50 microns maximum dimension.

6. A composition as claimed in claim 1, wherein the polymer granules are aggregates of primary polymer particles.

7. A composition as claimed in claim 1, wherein the polymer granules are spheroidal polymer beads.

8. A composition as claimed in claim 1, wherein pigment and/or extender is present in an amount of from 5 to 50% by volume of the non-volatile content of the composition.

9. A composition as claimed in claim 8, wherein the pigment and/or extender is present in the aqueous latex portion of the composition.

10. A composition as claimed in claim 8, wherein part or all of the pigment and/or extender is present in the non-solvent and/or the polymer granules.

* * * * *